United States Patent [19]

Imashiro et al.

[11] Patent Number: 4,939,210
[45] Date of Patent: Jul. 3, 1990

[54] PROCESS FOR PRODUCING PARABANIC ACID RING-CONTAINING POLYMER

[75] Inventors: Yasuo Imashiro; Satoshi Amano, both of Tokyo, Japan

[73] Assignee: Nisshinbo Industries, Inc., Tokyo, Japan

[21] Appl. No.: 311,749

[22] Filed: Feb. 17, 1989

[30] Foreign Application Priority Data

Mar. 19, 1988 [JP] Japan .................... 63-35134

[51] Int. Cl.$^5$ .................... C08G 18/02; C08K 3/18; C08K 5/09
[52] U.S. Cl. .................... 525/452; 528/363
[58] Field of Search .................... 525/452; 528/363

[56] References Cited

U.S. PATENT DOCUMENTS

| | | | |
|---|---|---|---|
| 3,933,758 | 1/1976 | Patton | 528/57 |
| 3,941,749 | 3/1976 | Frost | 528/363 |
| 4,028,311 | 6/1977 | Patton | 525/452 |
| 4,051,198 | 9/1977 | Patzschke | 528/363 |
| 4,096,130 | 6/1978 | Kraft et al. | 528/49 |

FOREIGN PATENT DOCUMENTS 1720744 7/1971 Fed. Rep. of Germany .
2066093 6/1982 Fed. Rep. of Germany .

OTHER PUBLICATIONS

Chemische Berichte, vol. 103 (1970), pp. 766–776; G. Zinner et al., "Addition bifunktioneller Carbonsaurechloride an Carbodiimide und einige Folgereaktionen".

*Primary Examiner*—John Kight, III
*Assistant Examiner*—A. U. Sridharan
*Attorney, Agent, or Firm*—Sherman and Shalloway

[57] ABSTRACT

A process for producing a parabanic acid ring-containing polymer, which comprises reacting a polycarbodiimide polymer with oxalyl chloride and then treating the reaction product with water.

12 Claims, No Drawings

PROCESS FOR PRODUCING PARABANIC ACID RING-CONTAINING POLYMER

This invention relates to a novel process for producing a parabanic acid ring-containing polymer.

Polymers containing a parabanic acid ring of the following formula

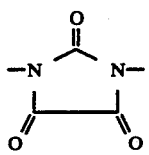

for example a polyparabanic acid resin having a structure of the following formula

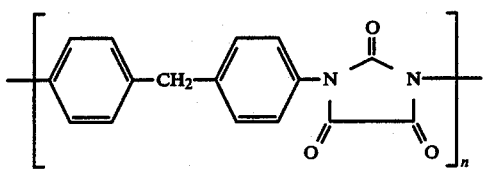

have thermal resistance comparable to polyimide resins, excellent electrical insulation over a wide range of frequencies, and good rigidity, strength and other mechanical properties, and have recently attracted attention as highly functional resins.

A prior known process for producing such a polyparabanic acid resin comprises reacting hydrogen cyanide with a diisocyanate to form a precursor polymer containing a 1,3-imidazolidine-1,3-diyl ring, and then hydrolyzing the precursor polymer (see Japanese Patent Publication No. 20960/1974). This method, however, has the defect of requiring dangerous hydrogen cyanide.

The present inventors have made extensive invetigations on a method of producing a parabanic acid ring-containing polymer, which is free from the aforesaid defect, and have now found that the use of a polycarbodiimide polymer as a starting material can easily gives a parabanic acid ring-containing polymer without the need for using dangerous hydrogen cyanide.

According to this invention, there is provided a process for producing a parabanic acid ring-containing polymer which comprises reacting a polycarbodiimide polymer with oxalyl chloride, and treating the reaction product with water.

The polycarbodiimide polymer used as a starting material in the process of this invention is known per se or may be produced by the same method as the method of producing the known polycarbodiimide polymer (see, for example, U.S. Pat. No. 2,941,969; Japanese Patent Publication No. 33279/1972; J. Org. Chem., 28, 2069-2075; Chemical Review, 1981, vol. 81, No. 4, 619-621). For example, it can be easily produced by condensation reaction of an organic diisocyanate involving elimination of carbon dioxide. The organic diisocyanate used for the production of the polycarbodiimide polymer may be any of aliphatic, alicyclic, aromatic and aromatic-aliphatic diisocyanates which may be used singly, or in combination to form copolymers.

The polycarbodiimide polymer used in the method of this invention includes homopolymers or copolymers comprising at least one type of recurring units represented by the following formula $$-R-N=C=N- \qquad (I)$$

wherein R represents an organic diisocyanate residue.

An aromatic diisocyanate residue is preferred as the organic diisocyanate residue R in formula (I). The term "organic diisocyanate residue", as used herein, denotes that part of organic diisocyanate molecules which results from removing the two isocyanate groups (NCO) therefrom. Specific examples of such polycarbodiimide polymers are those having the following recurring units.

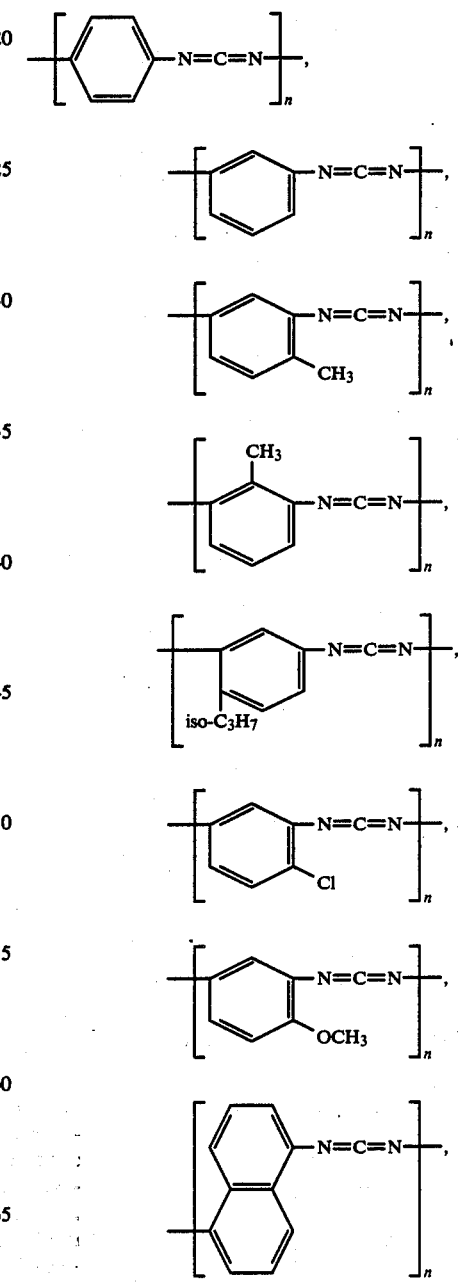

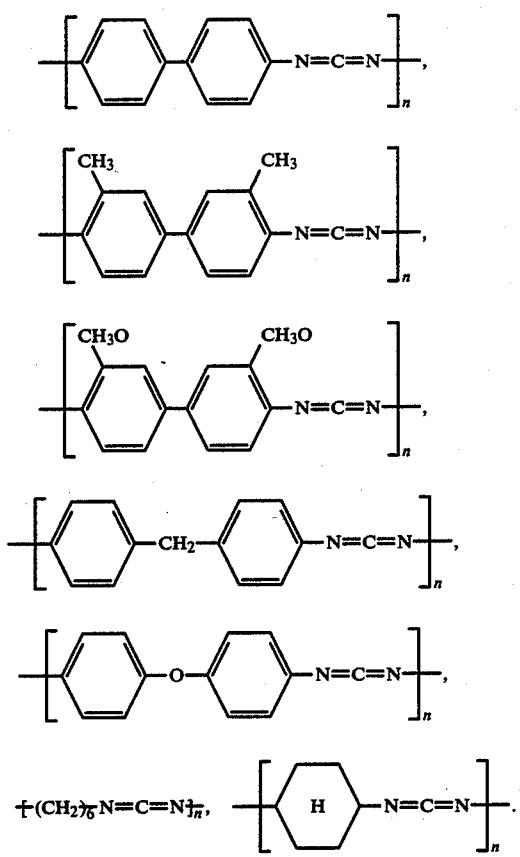

In the above formulae, n may be 2 to infinite.

The polycarbodiimide polymer that can be used in this invention may include copolymers containing two or more types of the above recurring units. The molecular weight of the polycarbodiimide polymer is not particularly limited. Generally, polycarbodiimide polymers having a number average molecular weight of 1,000 to 100,000, particularly 10,000 to 60,000, are preferred.

In accordance with the present invention, the polycarbodiimide polymer is first reacted with oxalyl chloride. The polycarbodiimide polymer, in the form of a pre-molded article such as a film, sheet or fiber, or a solid such as a powder, is immersed in oxalyl chloride or its solution, or is contacted with a vapor of oxalyl chloride. If desired, the polycarbodiimide polymer may be swollen beforehand by treatment with a solvent for the polycarbodiimide polymer, for example tetrachloroethylene, trichloroethylene, tetrahydrofuran, dioxane, monochlorobenzene, dichlorobenzene, dimethylformamide, N-methyl-2-pyrrolidione, dimethylacetamide, and dimethyl sulfoxide. Alternatively, the reaction may be accelerated by using the aforesaid swelling solvents for preparing the oxalyl chloride solution.

The above reaction may also be carried out by dissolving the polycarbodiimide polymer in a suitable solvent such as tetrachloroethylene, trichloroethylene, tetrahydrofuran, dioxane, monochlorobenzene, dichlorobenzene, dimethylformamide, dimethylacetamide, N-methyl-2-pyrrolidone or dimethyl sulfoxide, and adding oxalyl chloride to the resulting solution.

The reaction proceeds even at room temperature, but may be carried out at an elevated temperature of up to about 100° C. Since, however, too much heat is likely to induce self-addition of the polycarbodiimide polymer, temperatures ranging from room temperature to about 50° C. are usually preferred. The amount of oxalyl chloride used cannot be determined generically because it will vary depending upon the extent to which the carbodiimide linkage (—N=C=N—) in the polycarbodiimide polymer is converted to the parabanic acid ring. Its suitable amount is at least 1 equivalent, preferably 1 to 1.5 equivalents, per equivalent of the carbodiimide linkage in the starting polycarbodiimide polymer.

As a result of the above reaction, the carbodiimide linkage (—N=C=N—) is bonded to oxalyl chloride (COCl)$_2$ to change the recurring units of formula (I) to recurring units of the following formula

wherein R is as defined.

Substantially all of the recurring units of formula (I) in the starting polycarbodiimide polymer may be changed to the recurring units of formula (II). Alternatively, according to the properties desired of the final product, they may be partly changed to the recurring units of formula (II) to form a copolymer comprising the recurring units of formulae (I) and (II). The conversion may be changed freely by adjusting the conditions for the reaction between the polycarbodiimide polymer and oxalyl chloride.

The precursor polymer containing the recurring units of formula (II) obtained as above is then treated with water to give the desired polymer containing parabanic acid ring units represented by the following formula

wherein R is as defined above.

This treatment with water may be carried out by contacting the solid precursor polymer obtained by the above reaction with water or (a water vapor), or by dissolving the precursor polymer in a suitable solvent such as dimethylformamide, N-methyl-2-pyrrolidone or dimethylacetamide and then reacting it with water. Room temperature suffices as the treating temperature, but as required, the reaction system may be heated up to about 100° C. This leads to the efficient production of a polymer containing the parabanic acid ring units of general formula (II).

Since the thermosetting carbodiimide group can be left in the resulting parabanic acid ring-containing polymer as can be seen from the method of its synthesis, the process of this invention permits production of parabanic acid ring-containing polymer in various grades unlike parabanic acid polymers produced in general. The parabanic acid ring-containing polymer can be obtained in various forms such as a film, a varnish, a powder (molding material), and a fiber. By utilizing its excellent thermal resistance and strength, the parabanic acid ring-containing polymer provided by this invention can be used in various applications as an FPC base film, an insulation tape, a thermally resistant paint, a connector and other electrical component parts, and thermally resistant fibers. Furthermore, by leaving part of the carbodiimide group in the polymer and crosslinking the polymer, it can be handled as a thermosetting resin unlike conventional parabanic acid polymers which have been able to be handled only as thermoplastic polymers.

The following examples specifically illustrate the present invention.

EXAMPLE 1

A mixture of 2,4-tolylene diisocyanate and 2,6-tolylene diisocyanate (TDI; 80/20) was reacted in perchloroethylene at 120° C. for 4 hours together with a carbodiimidization catalyst (1-phenyl-3-methylphospholene oxide) to give a polycarbodiimide solution.

A film (I) was prepared from this solution by the dry method. The film (I) was immersed in oxalyl chloride and left to stand at room temperature for 5 hours and then treated with water to give a film (II). Analysis of the films (I) and (II) by infrared spectroscopy (IR) led to the determination that a peak at 2140 cm$^{-1}$ ascribed to the carbodiimide group decreased, and peaks at 1744 and 1380 cm$^{-1}$ ascribed to the carbonyl groups newly appeared. This shows that the carbodiimide was changed to parabanic acid (conversion 50 %, film thickness 25 micrometers). The properties of the films (I) and (II) are shown in Table 1.

TABLE 1

|  | Film (I) | Film (II) |
| --- | --- | --- |
| Density | 1.22 | 1.30 |
| Tensile strength | 11 kg/mm$^2$ | 11 kg/mm$^2$ |
| Young's modulus | 300 kg/mm$^2$ | 330 kg/mm$^2$ |
| Elongation at yield | 10% | 7% |
| Long-term thermal resistance (*) | 120° C. | 180° C. |
| Volume resistivity (**) | less than 10$^{16}$ Ω/cm | less than 10$^{16}$ Ω/cm |

(*): by UL 746 (same hereinafter)
(**): by JIS C2318 (same hereinafter)

EXAMPLE 2

4,4'-Diphenylmethane diisocyanate (MDI) was reacted in THF together with a carbodiimidization catalyst at 70°0 C. for 15 hours to give a polycarbodiimide solution.

A polycarbodiimide film (I) was prepared from the resulting solution by the dry method. The film (I) was immersed in oxalyl chloride and left to stand for 3 hours, and then treated with water to give a film (II). Analysis of the films (I) and (II) by IR gave the same results as in Example 1. The conversion to parabanic acid was 50% (film thickness 25 micrometers). The properties of the films (I) and (II) are shown in Table 2.

TABLE 2

|  | Film (I) | Film (II) |
| --- | --- | --- |
| Density | 1.19 | 1.32 |
| Tensile strength | 8 kg/mm$^2$ | 8.5 kg/mm$^2$ |
| Young's modulus | 200 kg/mm$^2$ | 220 kg/mm$^2$ |
| Elongation at yield | 15% | 10% |
| Long-term thermal resistance (*) | 150° C. | 180° C. |
| Volume resistivity (**) | less than 10$^{16}$ Ω/cm | less than 10$^{16}$ Ω/cm |

EXAMPLE 3

Diphenyl ether diisocyanate was reacted in THF together with a carbodiimidization catalyst at 70° C. for 20 hours to give a polycarbodiimide solution. A polycarbodiimide film (I) was prepared from the resulting solution by the dry method. A film (II) was prepared from the film (I) in the same way as in Example 2. The properties of the films (I) and (II) are shown in Table 3.

TABLE 3

|  | Film (I) | Film (II) |
| --- | --- | --- |
| Density | 1.21 | 1.32 |
| Tensile strength | 9 kg/mm$^2$ | 9.5 kg/mm$^2$ |
| Young's modulus | 280 kg/mm$^2$ | 300 kg/mm$^2$ |
| Elongation at yield | 15% | 10% |
| Long-term thermal resistance (*) | 150° C. | 180° C. |
| Volume resistivity (**) | less than 10$^{16}$ Ω/cm | less than 10$^{16}$ Ω/cm |

EXAMPLE 4 o-Toluidine diisocyanate (TODI) was reacted in a chlorobenzene/THF mixed solvent together with a carbodiimidization catalyst at 85° C. for 10 hours to form a polycarbodiimide solution.

A polycarbodiimide film (I) was prepared from the resulting solution by the dry method. A film (II) was prepared from the film (I) in the same way as in Example 1. The properties of the resulting films are shown in Table 4.

TABLE 4

|  | Film (I) | Film (II) |
| --- | --- | --- |
| Density | 1.23 | 1.32 |
| Tensile strength | 9 kg/mm$^2$ | 10 kg/mm$^2$ |
| Young's modulus | 300 kg/mm$^2$ | 300 kg/mm$^2$ |
| Elongation at yield | 10% | 7% |
| Long-term thermal resistance (*) | 150° C. | 180° C. |
| Volume resistivity (**) | less than 10$^{16}$ Ω/cm | less than 10$^{16}$ Ω/cm |

EXAMPLE 5

1-Methoxy-2,4-phenylene diisocyanate was reacted in a perchloroethylene/dioxane mixed solvent together with a carbodiimidization catalyst at 120° C. for 4 hours to form a polycarbodiimide solution.

A polycarbodiimide film (I) was prepared from the resulting solution by the dry method. A film (II) was prepared from the film (I) in the same way as in Example 1. The properties of the resulting films are shown in Table 5.

TABLE 5

|  | Film (I) | Film (II) |
| --- | --- | --- |
| Density | 1.24 | 1.32 |
| Tensile strength | 10 kg/mm$^2$ | 11 kg/mm$^2$ |
| Young's modulus | 280 kg/mm$^2$ | 300 kg/mm$^2$ |
| Elongation at yield | 15% | 10% |
| Long-term thermal resistance (*) | 140° C. | 180° C. |
| Volume resistivity | less than | less than |

TABLE 5-continued

|  | Film (I) | Film (II) |
|---|---|---|
| (**) | $10^{16}$ Ω/cm | $10^{16}$ Ω/cm |

EXAMPLE 6

The polycarbodiimide film (I) obtained in Example 1 was exposed to a saturated vapor or oxalyl chloride at room temperature for 4 to 5 hours, and then treated with water to give a film (II). The IR and properties of the resulting film (II) were measured, and the results as in Example 1 were obtained.

EXAMPLE 7

The polycarbodiimide film (I) obtained in Example 2 was exposed to a saturated vapor of oxalyl chloride at room temperature for 4 hours, and then treated with water to give a film (II). The IR and properties of the resulting film (II) were measured, and the same results as in Example 2 were obtained.

EXAMPLE 8

The polycarbodiimide film (I) obtained in Example 3 was exposed to a saturated vapor of oxalyl chloride at room temperature for 5 to 6 hours, and then treated with water to give a film (II). The IR and properties of the resulting film (II) were measured, and the same results as in Example 3 were obtained.

EXAMPLE 9

To the polycarbodiimide solution obtained in Example 1 was slowly added dropwise 1.5 equivalents, per equivalent of the carbodiimide group, of oxalyl chloride. When the mixture was stirred for 7 hours, a pale yellow precipitate formed. After filtration, the resulting precipitate was washed in warm water until it became neutral. The product was further washed several times with methanol, and the resulting pale yellow powder was subsequently dried in vacuum at 80° C. for 3 hours. IR analysis of the resulting powder showed that absorptions ascribed to parabanic acid appeared at 1744 and 1380 cm$^{-1}$, and the peak at 2140 ascribed to the absorption of the carbodiimide group decreased.

The pale yellow powder was dissolved in N-methylpyrrolidone (NMP), and a film was prepared from the solution by the dry method. The properties of the film were measured, and the results are shown in Table 6.

TABLE 6

| Parabanic acid conversion | 60% |
|---|---|
| Density | 1.30 |
| Tensile strength | 9 kg/mm$^2$ |
| Young's modulus | 300 kg/mm$^2$ |
| Elongation at yield | 8% |
| Long-term thermal resistance | 180° C. |
| Solder bath test (260° C., 15 sec.) (*) | acceptable |
| Volume resistivity | less than $10^{16}$ Ω/cm |

(*) By JIS C6481 (same hereinafter)

EXAMPLE 10

To the polycarbodiimide solution obtained in Example 2 was slowly added dropwise a tetrachloroethylene solution of 1.3 equivalents, per equivalent of the carbodiimide group, of oxalyl chloride. When the mixture was stirred for 10 hours, a pale yellow precipitate formed. The precipitate was collected and treated in the same way as in Example 9. It was determined that the carbodiimide group was changed to parabanic acid. The resulting pale yellow powder was dissolved in NMF, and a film was prepared from the solution by the dry method. The properties of the film were measured, and the results are shown in Table 7.

TABLE 7

| Parabanic acid conversion | 80% |
|---|---|
| Density | 1.33 |
| Tensile strength | 11 kg/mm$^2$ |
| Young's modulus | 280 kg/mm$^2$ |
| Elongation at yield | 10% |
| Long-term thermal resistance | 180° C. |
| Solder bath test (260° C., 15 sec.) (*) | acceptable |
| Volume resistivity | less than $10^{16}$ Ω/cm |

EXAMPLE 11

The polycarbodiimide film (I) obtained in Example 1 was immersed at room temperature for 3 hours in a tetrachloroethylene solution of oxalyl chloride in an amount which was in a large excess with respect to the carbodiimide group. Then, the film was treated with water, and dried at 60° C. for 2 hours. The parabanic acid conversion of the resulting film was 50%, and it had much the same properties as the film (II) in Table 1. The results show that treatment of the film with a swelling solvent makes the reaction proceed rapidly.

EXAMPLE 12

The polycarbodiimide film (I) obtained in Example 2 was immersed at room temperature for 2 hours in a tetrachloroethylene solution of oxalyl chloride in an amount which was in a large excess with respect to the carbodiimide group. Then, the film was treated with water, and dried at 60° C. for 2 hours. The parabanic acid conversion of the resulting film was 50 %, and it had much the same properties as the film (II) in Table 2. The results shows that treatment of the film with a swelling solvent makes the reaction proceed rapidly.

EXAMPLE 13

P-Phenylene diisocyanate was reacted in THF for 5 hours together with a carbodiimidization catalyst to obtain polycarbodiimide as a powder.

The powder was immersed at room temperature for 10 hours in oxalyl chloride, and then treated with water. The powder was then washed with methanol, and dried in vacuum at 40° C. for 5 hours. IR analysis of the resulting powder showed that characteristic absorptions appeared at 1744 and 1380 cm$^{-1}$, and the absorption of the carbodiimide group at 2140 cm$^{-1}$ decreased. The powder was dissolved in NMP and a film was prepared from the solution by the dry method. The properties of the film are shown in Table 8.

TABLE 8

| Parabanic acid conversion | 70% |
|---|---|
| Tensile strength | 8 kg/mm$^2$ |
| Young's modulus | 240 kg/mm$^2$ |
| Solder bath test (260° C., 15 sec.) (*) | acceptable |
| Volume resistivity | less than $10^{16}$ Ω/cm |

EXAMPLE 14

Naphthylene diisocyanate was raected at 70° C. for 8 hours in THF together with a carbodiimidization catalyst to give a white powder of polycarbodiimide.

The powder was immersed in oxalyl chloride at room temperature for 10 hours, and treated with water. It was then washed with methanol and dried in vacuum at 40° C. for 5 hours. IR analysis of the resulting powder showed that characteristic absorptions appeared in the vicinity of 1740 and 1380 cm$^{-1}$. This demonstrates that the the diisocyanate was changed to parabanic acid. The powder was dissolved in NMP, and a film was prepared from the solution by the drying method. The properties of the film are shown in Table 9.

TABLE 9

| Parabanic acid conversion | 80% |
|---|---|
| Tensile strength | 6 kg/mm$^2$ |
| Young's modulus | 280 kg/mm$^2$ |
| Solder bath test (260° C., 15 sec.) (*) | acceptable |
| Volume resistivity | less than 10$^{16}$ Ω/cm |

EXAMPLE 14

MDI was reacted in tetrachloroethylene at 120° C. for 6 hours to give a white powder of polycarbodiimide to give a white powder of polycarbodiimide.

The powder was immersed at room temperature for 5 hours in a tetrachloroethylene solution of oxalyl chloride in an amount which was in a large excess with respect to the carbodiimide group, and then treated with warm water. The powder was then washed with methanol, and dried in vacuum at 40° C. for 6 hours. IR analysis of the resulting powder showed that the characteristic absorption of parabanic acid was seen, and most of the characteristic absorption of the carbodiimide group disappeared. The powder was dissolved in NMP and a film was prepared from the solution by the dry method. The properties of the film are shown in Table 10.

TABLE 10

| Parabanic acid conversion | above 90% |
|---|---|
| Tensile strength | 11 kg/mm$^2$ |
| Young's modulus | 250 kg/mm$^2$ |
| Solder bath test (260° C., 15 sec.) (*) | acceptable |
| Volume resistivity | less than 10$^{16}$ Ω/cm |

EXAMPLE 16

Cyclohexyl diisocyanate was reacted in THF at 70° C. for 10 hours to give a white powder of polycarbodiimide.

The powder was immersed at room temperature for 5 hours in THF containing oxalyl chloride in an amount which was in a large excess with respect to the carbodiimide group, and after filtration the resulting powder was washed until it no longer gave a smell of oxalyl chloride. It was dried in vacuum at 30° C. for 5 hours. IR analysis of the resulting pale yellow powder showed that the absorption ascribed to the carbodiimide group mostly disappeared, and an absorption based on C—Cl newly appeared near 750 cm$^-$. This powder is therefore considered to be a chloro adduct which is a precursor of parabanic acid. The powder was dissolved in NMP. When the solution was put in water, the powder changed to polyparabanic acid while evolving hydrogen chloride gas. IR analysis showed that the absoprtion based on C—Cl near 750 cm$^-$ disappeared, and the absorptions of parabanic acid appeared near 1744 and 1380 cm$^{-1}$.

The powder was dissolved in NMP, and a film was prepared from the solution by the dry method. The properties of the film are shown in Table 11.

TABLE 11

| Parabanic acid conversion | 80% |
|---|---|
| Tensile strength | 7 kg/mm$^2$ |
| Young's modulus | 250 kg/mm$^2$ |
| Solder bath test (260° C., 15 sec.) (*) | acceptable |
| Volume resistivity | less than 10$^{16}$ Ω/cm |

EXAMPLE 17

Polycarbodiimide fibers (I) were prepared by a dry spinning method from a polycarbodiimide solution synthesized by the method of Example 1.

The fibers were treated with oxalyl chloride and water by the same method as in Example 1 to give fibers (II). The properties of the fibers (I) and (II) are shown in Table 12.

TABLE 12

| | Fibers (I) | Fibers (II) |
|---|---|---|
| Fiber diameter (μm) | 100 | 100 |
| Tensile strength (kg/mm$^2$) | 100 | 100 |
| Young's modulus (kg/mm$^2$) | 1,500 | 1,550 |
| Elongation at yield (%) | 15 | 13 |

EXAMPLE 18

The polycarbodiimide fibers obtained in Example 17 were treated with a saturated vapor of oxalyl chloride in the same way as in Example 6 to form a fibers (II) similar to the fibers (II) obtained in Example 17. The fibers (II) had properties equivalent to those of the fibers (II) obtained in Example 17.

We claim:

1. A process for producing a parabanic acid ring-containing polymer, which comprises reacting a polycarbodiimide polymer with oxalyl chloride and then treating the reaction product with water.

2. The process of claim 1 in which the polycarbodiimide polymer is a homopolymer or a copolymer comprising at least one type of recurring units represented by the following formula

—R—N=C=N— wherein R represents an organic diisocyanate residue.

3. The process of claim 2 in which R is an aromatic diisocyanate residue.

4. The process of claim 1 in which the polycarbodiimide polymer in the form of a solid is immersed in oxalyl chloride or its solution, or is contacted with a vapor of oxalyl chloride.

5. The process of claim 4 in which the polycarbodiimide polymer is treated with a solvent for it prior to the reaction.

6. The process of claim 1 in which the polycarbodiimide polymer in the form of a solution is reacted with oxalyl chloride.

7. The process of claim 1 in which the reaction of the polycarbodiimide polymer with oxalyl chloride is carried out at a temperature of from room temperature to about 100° C.

8. The process of claim 7 in which the reaction is carried out at a temperature ranging from room temperature to about 50° C.

9. The process of claim 1 in which the treatment with water is carried out at a temperature of from room temperature to about 100° C.

10. The process of claim 9 in which the treatment with water is carried out at room temperature.

11. The process of claim 1 in which part or all of the carbodiimide linkage in the polycarbodiimide polymer is changed to parabanic acid ring units.

12. The process of claim 11 in which the parabanic acid ring units represented by the following formula

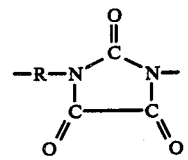

wherein R represents an organic diisocyanate residue.

* * * * *

UNITED STATES PATENT AND TRADEMARK OFFICE
CERTIFICATE OF CORRECTION

PATENT NO. : 4,939,210

DATED : July 3, 1990

INVENTOR(S) : Yasuo Imashiro, et al

It is certified that error appears in the above-identified patent and that said Letters Patent is hereby corrected as shown below:

On the title page: Item [30]:

Foreign Priority Date "March 19, 1988" should be --February 19, 1988--. (PTO)

Signed and Sealed this

Tenth Day of August, 1993

Attest:

MICHAEL K. KIRK

Attesting Officer

Acting Commissioner of Patents and Trademarks